United States Patent [19]

Valint et al.

[11] Patent Number: 5,100,953

[45] Date of Patent: Mar. 31, 1992

[54] SOLUTIONS OF HYDROPHOBICALLY ASSOCIATING TERPOLYMERS CONTAINING SULFONATE FUNCTIONALITY

[75] Inventors: Paul L. Valint, Asbury; Jan Bock, Bridgewater, both of N.J.

[73] Assignee: Exxon Research and Engineering Company, Florham Park, N.J.

[21] Appl. No.: 545,029

[22] Filed: Jun. 28, 1990

Related U.S. Application Data

[60] Division of Ser. No. 172,331, Mar. 23, 1988, which is a continuation-in-part of Ser. No. 845,197, Mar. 28, 1986, abandoned.

[51] Int. Cl.$^5$ .............................................. C08L 41/00
[52] U.S. Cl. ..................................................... 524/547
[58] Field of Search ........................................ 524/547

[56] References Cited

U.S. PATENT DOCUMENTS 4,959,432  9/1990  Fan ....................................... 526/287

*Primary Examiner*—Christopher Henderson
*Attorney, Agent, or Firm*—Richard E. Nanfeldt; Joseph J. Dvorak

[57] ABSTRACT

This invention describes novel hydrophobically associating terpolymers containing sulfonate functionality which are useful as aqueous fluid rheology or flow modifiers. These high molecular weight water soluble polymers contain both water soluble and water insoluble monomers. The water soluble monomers are acrylamide (AM) and a salt of an ethylenically unsaturated sulfonic acid (S) and the water insoluble monomer is a higher alkyl acrylamide (R). These polymers are referred referred to as SRAM. The process for their preparation relies on solubilizing the water insoluble monomer into an aqueous micellar solution containing one or more surfactants and the water soluble monomers. The surfactants are specifically selected to enable homogeneous dispersion of the hydrophobic monomer(s) in the presence of anionic sulfonate containing monomers. Redox or free radical initiators are used to copolymerize both the water soluble and water insoluble monomers, forming terpolymers of ethylenically unsaturated sulfonic acids, alkylacrylamides and acrylamide. Aqueous solutions of these hydrophobically associating polymers exhibit enhanced viscosification, reduced salt sensitivity and other desirable rheological properties found useful in a variety of applications.

2 Claims, No Drawings

SOLUTIONS OF HYDROPHOBICALLY ASSOCIATING TERPOLYMERS CONTAINING SULFONATE FUNCTIONALITY

Rule 60 Division of U.S. Ser. No. 172,331, filed Mar. 23, 1988, which is a continuation-in-part Application of U.S. Ser. No. 845,197, filed Mar. 28, 1986, now abandoned.

BACKGROUND OF THE INVENTION

1. Field of the Invention

This invention relates to novel hydrophobically associating terpolymers containing sulfonate functionality which are useful as aqueous fluid rheology or flow modifiers. These high molecular weight water soluble polymers contain both water soluble and water insoluble monomers. The water soluble monomers are acrylamide (AM) and a salt of an ethylenically unsaturated sulfonic acid (S) and the water insoluble monomer is a higher alkylacrylamide (R). These polymers will hereinafter be referred to as SRAM. The process for their preparation relies on solubilizing the water insoluble monomer into an aqueous micellar solution containing one or more surfactants and the water soluble monomers. The surfactants are specifically selected to enable homogeneous dispersion of the hydrophobic monomer(s) in the presence of anionic sulfonate containing monomers. Redox or free radical initiators are used to copolymerize both the water soluble and water insoluble monomers forming terpolymers of ethylenically unsaturated sulfonic acids, alkylacrylamides and acrylamide. Aqueous solutions of these hydrophobically associating polymers exhibit enhanced viscosification, reduced salt sensitivity and other desirable rheological properties found useful in a variety of applications.

DESCRIPTION OF THE PRIOR ART

Polyacrylamide (PAM) and partially hydrolyzed polyacrylamide (HPAM) are well known water soluble polymers used as flocculation aids for waste water treatment and dewatering sludge and for rheology control for secondary or tertiary oil recovery. Further examples of the properties and use of these polymers can be found in *Handbook of Water Soluble Gums and Resins*, R. L. Davidson, Ed., McGraw Hill, 1980, chapter 16 by H. Volk and R. E. Friedrich or in *Water-Soluble Polymers*, N. M. Bikales, Ed., Plenum Press, 1973, page 105, by D. C. Williams, J. H. Rogers and T. J. West. Polyacrylamides rely on a combination of high molecular weight and chain expansion due to repulsion of pendent ionic groups along the polymer chain to viscosify or thicken aqueous fluids. However, high molecular weight polymers mechanically degrade when subjected to large elongational or shear stresses, such as are found in pumps or during injection into reservoir rocks. This degradation results in permanent reduction in polymer molecular weight and, in turn, loss of viscosification efficiency. The presence of cations in aqueous solution, in particular divalent cations, shields the ionic charged groups on the polymer. This causes the polymer chains to collapse into a random coil-type configuration, losing significant viscosification efficiency. Thus, polymeric viscosifiers based on an alternative mechanism of viscosification, providing improved mechanical stability and salt tolerance relative to PAM and HPAM polymers would be highly desirable.

Water soluble copolymers of acrylamide and sulfonated monomers have been studied as aqueous fluid viscosifiers and flocculation agents. For example, C. L. McCormick and G. S. Chen, *J. Polymer Science: Polymer Chemistry Ed.*, Volume 20, B17-B38 (1982) described the synthesis and characteristics of random copolymers of acrylamide and sulfonated monomers, such as sodium-2-sulfoethyl methacrylate or sodium-2-acrylamido-2-methylpropane sulfonate. In a recent paper on the dilute solution properties of these polymers, H. H. Neidlinger, G. S. Chen and C. L. McCormick, *J. of Applied Polymer Science*, Volume 29, 713-730 (1984) noted the high salt sensitivity of these polymers, particularly for copolymer compositions containing more than about 25 mole percent sulfonate monomer. U.S. Pat. No. 4,342,653 teaches the use of random copolymers of acrylamide and AMPS for the flocculation of suspended solids in such aqueous systems as phosphate slime, uranium acid leach residue, etc.

Processes for preparing polyacrylamides are well known in the art. Tanaka, et al., U.S. Pat. No. 4,154,910, teaches an aqueous solution method using the heat of polymerization to concentrate the product. Zimmerman, et al., U.S. Pat. No. 3,211,708, teaches an oil-in-water bead polymerization for polymerizing water soluble monomers. These techniques result in moderate molecular weight polymers exhibiting poor viscosification efficiency, particularly in saline solutions. Kolodny, U.S. Pat. No. 3,002,960, teaches a low temperature, redox initiated solution polymerization resulting in high molecular weight polyacrylamide. Another approach to high molecular weight water soluble polymers is described by J. W. Vanderhoff, et al., U.S. Pat. No. 3,284,393, where water soluble monomers are polymerized at high concentration in a water-in-oil emulsion. While some of these processes allow high molecular weight polymers to be prepared, the resulting polyacrylamide, PAM, and partially hydrolyzed polyacrylamide, HPAM, and copolymers of acrylamide and sulfonated monomer, SAM, systems provide only fair viscosification efficiency, poor mechanical stability and low salt tolerance.

One approach to overcoming the deficiencies in these polyacrylamide based systems is described by Bock, et al. in U.S. Pat. No. 4,520,182. Water soluble acrylamide copolymers containing a small amount of oil soluble or hydrophobic alkylacrylamide groups were found to impart efficient viscosification to aqueous fluids. Furthermore, these alkylacrylamideacrylamide copolymers (RAM) were nonionic and thus were relatively insensitive to the level of salt in the water. However, these polymers required concentrations above about 2,000 ppm to provide significant viscosification. Landoll, U.S. Pat. No. 4,304,902, describes copolymers of ethylene oxide with long chain epoxides which also required relatively large polymer concentration (approximately 1%) for thickening water and required surfactants for solubility due to irregularities in the polymerization. In a related case, U.S. Pat. No. 4,428,277, modified nonionic cellulose ether polymers are described. Although these polymers showed enhanced viscosification relative to polymers not containing hydrophobic groups, the viscosification efficiency was very low, requiring two to three weight percent polymer, to provide an enhancement. The use of surfactants to enable solubility and, in turn, viscosification by a water soluble polymer containing hydrophobic groups is described by Evani, European Patent No. 0 057 875. The hydrophobic groups claimed are attached to the polymer via an acrylate linkage which is known to have poor hydrolytic stability. In addition, the need for a surfactant to achieve solubility and thickening efficiency should make such a system very salt or temperature sensitive, as well as very sensitive to small changes in surfactant and polymer concentration. Emmons, et al., U.S. Pat. No. 4,395,524, teaches acrylamide copolymers as thickeners for aqueous systems. While these polymers possess hydrophobic groups, they are prepared using alcohol containing solvents which are known chain transfer agents. The resulting polymers have rather low molecular weights and, thus, relatively high polymer concentrations are required to achieve reasonable viscosification of water based fluids.

One of the objects of this invention is to overcome the deficiencies in the use of the water soluble polymers of the prior art for thickening aqueous fluids. A new class of water soluble polymer will be described which impart enhanced viscosification to aqueous fluids, improved mechanical stability and better salt tolerance. These new polymers contain a nonionic water soluble monomer, such as acrylamide, an anionically charged water soluble ethylenically unsaturated sulfonated monomer, such as an alkali metal salt of a vinyl alkylsulfonic acid, and a water insoluble or hydrophobic monomer, such as an alkylacrylamide, with a chain length of six carbons or greater. When these polymers are placed in an aqueous solvent, the hydrophobic groups aggregate c associate in a manner similar to a surfactant. This hydrophobic association between polymer chains in solution results in an increase in the hydrodynamic size of the molecule, which, in turn, causes an increase in viscosity. We have found that the presence of ionic groups, such as sodium 2-acrylamide-2-methylpropane sulfonate, AMPS ®, cause an expansion of the polymer in solution, an improvement in polymer solubility and a favorable interaction with the hydrophobic groups. Thus, polymers containing both ionic sulfonate groups and hydrophobic groups provide a significant improvement in viscosification efficiency of water based systems.

Synthesis of the hydrophobically associating polymers of the instant invention presents difficulties. In order for polymerization to be effected the monomers must obviously come into close proximity to one another. The incompatibility of the oil soluble and water soluble monomers prevents an effective concentration of one or the other of these monomeric species from being achieved at the locus of polymerization of the other comonomer. Thus, a method for preparing the novel sulfonate containing hydrophobically associating polymers of this invention is needed. A variety of processes based upon prior art could conceivably achieve this, but have serious deficiencies. For example, simply dispersing the water insoluble monomer as fine particles in the aqueous medium containing dissolved water soluble monomers would result in low incorporation of the water insoluble monomer and would lead to a heterogeneous product of particles dispersed in a predominantly water soluble polymer. The resulting polymer could not be used to impart efficient and uniform thickening to water based fluids.

Techniques for polymerizing water soluble polymers, such as those taught in U.S. Pat. Nos. 4,154,190, 3,211,708, 3,002,906 and 3,284,393, cannot be used to prepare the compositions of this invention. This art does not teach the formation of a sufficiently fine dispersion of the water and oil soluble monomers to enable uniform reaction and efficient aqueous viscosifiers to be prepared. The use of mutual solvents or solvent mixtures to dissolve the water and oil soluble monomers, as taught by Lenke, et al., U.S. Pat. No. 4,151,333, and Barua, et al., U.S. Pat. No. 4,098,987, have some serious limitations. Although this approach undoubtedly allows the incompatible monomers to come into close proximity to one another, since the dispersion is on a molecular scale, often the resulting copolymer is insoluble in the same solvent as shown in U.S. Pat. No. 4,151,333. This leads to precipitation of the copolymer before it has achieved sufficient molecular weight to provide efficient aqueous viscosification. The use of water miscible solvents, such as alcohols, ether and acetone, either alone or with water, as taught in U.S. Pat. No. 4,098,987, results in extremely low molecular weight (e.g., 10,000) polymers due to the high chain transfer characteristics of these solvents. Thus, polymers produced by these teachings are rather ineffective viscosifiers for aqueous fluids.

Two techniques have been found most useful for preparing hydrophobically associating copolymers of acrylamide and alkylacrylamides. The first method was based on the use of a water continuous microemulsion to disperse the oil soluble monomer in a solution of the water soluble monomers. Details of the procedures and techniques are taught by Turner, et al., U.S. Pat. No. 4,521,580. A second method for preparing copolymers of acrylamide and alkylacrylamide was based on dispersing the oil soluble monomers using an aqueous micellar solution of the water soluble monomers. Suitable surfactants and the details of the polymerization are taught by Turner, et al. in U.S. Pat. No. 4,528,348. While either the microemulsion or micellar polymerization techniques can be used to prepare hydrophobically associating polymers containing a variety of water soluble nonionic monomers, a problem arises when the monomers have a strong interaction with the surfactants used in the polymerization. In particular, strong ionic interactions or complexes can be formed between anionic water soluble monomers, such as ethylenically unsaturated alkyl sulfonates, and cationic surfactants, such as quaternary alkyl amines. A copending application, U.S. Pat. No. 4,730,028, teaches a means of overcoming these deficiencies to enable preparation of the novel hydrophobically associating terpolymers of this invention.

SUMMARY OF THE INVENTION

This invention describes novel hydrophobically associating terpolymer compositions containing sulfonate functionality. The polymers consist of a water soluble nonionic monomer, such as acrylamide, a water soluble anionic sulfonate monomer, such as sodium 2-acrylamido-2-methylpropane sulfonate, and an oil soluble hydrophobic alkylacrylamide monomer. These terpolymers provide efficient viscosification of water or brine solutions. The anionic sulfonate groups improve polymer solubility in water and brine, particularly in the presence of salts containing divalent cations, and impart some chain stiffness due to charge repulsion, particularly in water containing a low electrolyte concentration. The hydrophobic N-alkylacrylamide groups associate in solution to create a structure with an apparent increase in molecular weight, resulting in enhanced thickening efficiency. Thus, the anionic sulfonate groups and hydrophobic groups are balanced to provide water and brine solubility, along with excellent thickening efficiency. In addition, aqueous fluids thickened with the polymer compositions of this invention have improved mechanical stability when subjected to high shear and better salt tolerance relative to polymers relying on molecular weight in place of the hydrophobic associations for viscosification.

DETAILED DESCRIPTION OF THE INVENTION

The present invention describes novel terpolymers consisting of a nonionic, water soluble, ethylenically unsaturated monomer, such as acrylamide; a water soluble, anionic ethylenically unsaturated alkylsulfonate monomer, such as salts of 2-acrylamido-2-methylpropane sulfonate; and a water insoluble monomer, such as an alkylacrylamide. The resulting terpolymers are efficient viscosifiers of water and brine. The water soluble hydrophobically associating terpolymers of the instant invention are characterized by the formula:

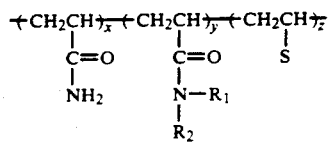

wherein S is $SO_3M$, phenyl $SO_3M$ or $CONHC(CH_3)_2CH_2SO_3M$; $R_1$ is a $C_4$ to $C_{18}$ alkyl, cycloalkyl or aralkyl group; $R_2$ is hydrogen, a $C_4$ to $C_{18}$ alkyl, cycloalkyl or aralkyl group; x is about 10 mole percent to about 90 mole percent; y is about 0.1 mole percent to about 10 mole percent and z is about 5 to about 80 mole percent. Typical, but non-limiting, examples of preferred alkyl groups are hexyl, octyl, decyl, dodecyl and hexadecyl groups. Typical, but nonlimiting, examples of preferred cations are sodium, potassium and ammonium. The mole percentage of acrylamide, x, is preferably about 5 to about 98, more preferably about 10 to about 90, and most preferably about 20 to about 80. The mole percentage of the salt of the sulfonate containing monomer, z, is preferably about 2 to about 95, more preferably about 5 to about 90, and most preferably about 10 to about 80. The mole percentage of the hydrophobic group, y, is preferably about 0.1 to about 10.0, more preferably about 0.2 to about 5.0, and most preferably about 0.2 to about 3.0.

The molecular weight of the water soluble terpolymers of this invention is sufficiently high that they are efficient viscosifiers of water or brine, but not so high that the polymer molecules are readily susceptible to irreversible shear degradation. Thus, the weight average molecular weights are preferably about 200,000 to about 10,000,000, more preferably about 500,000 to about 8,000,000, and most preferably about 1,000,000 to about 7,000,000. The intrinsic viscosity of these polymers as measured in 2% sodium chloride solution is preferably greater than about 1 dl/g.

The novel hydrophobically associating sulfonate-containing terpolymers of this invention are prepared by a novel micellar free radical terpolymerization process more fully described in copending application U.S. Pat. No. 4,730,028. The process comprises the steps of forming a micellar surfactant solution of the oil soluble or hydrophobic alkyl acrylamide in an aqueous solution of acrylamide; deaerating this solution by purging with nitrogen or additionally applying a vacuum; raising the temperature to the desired reaction temperature; adding sufficient free radical initiator to the reaction solution; and polymerizing for a sufficient period of time at a sufficient temperature to complete polymerization. The resulting terpolymer of acrylamide, a salt of an ethylenically unsaturated alkyl or aryl sulfonic acid and a hydrophobic N-alkylacrylamide can be isolated from the reaction mixture by any of a variety of techniques which are well known to one skilled in the art. For example, the polymer may be recovered by precipitation using a nonsolvent, such as acetone, methanol, isopropanol or mixtures thereof. The precipitated polymer can then be washed and oven dried to provide a product in the form of a free flowing powder. Alternatively, the polymer solution may be used as is by diluting with the desired aqueous solvent to the concentration of use.

The process for synthesizing these terpolymers relies on solubilizing the water insoluble monomer into a predominantly aqueous media by the use of a suitable water soluble surfactant, such as sodium dodecyl sulfate. When mixed with an aqueous solution of the water soluble acrylamide monomer and the water soluble sulfonate monomer, the surfactant solution can disperse the water insoluble monomer on an extremely fine scale so that the reaction mixture is isotropic, clear and homogeneous. These micellar reaction mixtures are free of visible oil droplets or particulates of the water insoluble monomer. The terpolymerization can, therefore, be initiated by water soluble initiators to yield terpolymers which are substantially free of visible particulates. The resultant reaction mixture remains homogeneous throughout the course of the reaction without the need for agitation with external mixers or stirrers.

Micelles formed by the surfactant which solubilize the water insoluble monomer are generally small aggregates which consist of on the order of 50 to 200 molecules. They may assume a variety of shapes, from spherical to rod-like or cylindrical, and generally are in the size range of from about 20 Angstroms to 500 Angstroms in diameter. These micelles form spontaneously upon mixing the components together, i.e., they do not require the vigorous mixing conditions required in conventional emulsion polymerization in which macroemulsions are formed. The macroemulsion droplets of the conventional emulsion polymerization process have diameters which are at least 10,000 Angstroms. They, therefore, tend to phase separate upon standing, leading to undesirable inhomogenities in the produced copolymer. The homogeneous micellar reaction mixture is, on the other hand, much more stable against demixing than the formulations used in emulsion polymerization processes. Indeed, no stirring is required during the course of the micellar copolymerization—the micellar aggregates remain extremely finely dispersed throughout. Moreover, the finely dispersed nature of the micellar aggregates permit the terpolymerization to occur in such a way that a water soluble terpolymer is produced which does not contain particulates or latexes of water insoluble polymers. These would be detrimental in such applications as secondary oil recovery, which requires a product which is substantially free of pore plugging particulates.

The surfactants which may be used in this process may be one of the water soluble surfactants, such as salts of alkyl sulfates, sulfonates and carboxylates, or alkyl arene sulfates, sulfonates or carboxylates. Preferred are sodium or potassium salts of decyl sulfate, dodecyl sulfate or tetradecylsulfate. For these ionic surfactants the Krafft point, which is defined as the minimum temperature for micellar formation, must be below the temperature used for the polymerization. Thus, at the conditions of polymerization the desired surfactant will form micelles which solubilize the water insoluble monomer. Nonionic surfactants can also be used for preparing the polymers of this invention. For example, ethoxylated alcohols, ethoxylated alkyl phenols, ethoxylated dialkyl phenols, ethylene oxide-propylene oxide copolymers and polyoxyethylene alkyl ethers and esters can be used. Preferred nonionic surfactants are ethoxylated nonyl phenol with 5 to 20 ethylene oxide units per molecule, ethoxylated dinonyl phenol containing 5 to 40 ethylene oxide units per molecule and ethoxylated octyl phenol with 5 to 15 ethylene oxide units per molecule. Surfactants which contain both nonionic and anionic functionality, e.g., sulfates and sulfonates of ethoxylated alcohols and alkyl phenols, can also be used.

Combinations of anionic and nonionic surfactants can also be used, as long as the surfactants solubilize the hydrophobic monomer into an aqueous phase containing the water soluble monomers. The surfactant or mixtures of surfactants will be used at concentrations above their critical micelle concentration and preferably at concentrations such that only one hydrophobic monomer is associated with a surfactant micelle. Thus, the actual concentration of surfactant for a given polymerization will depend on the concentration of oil soluble or hydrophobic monomers employed.

Polymerization of the water soluble and water insoluble monomers is effected in an aqueous micellar solution containing a suitable free radical initiator. Examples of suitable water soluble free radical initiators include peroxides, such as hydrogen peroxide, and persulfates, such as sodium, potassium or ammonium persulfate. The concentration of the free radical initiator is about 0.01 to about 0.5 grams per hundred grams of total monomers. Suitable oil soluble initiators are organic peroxides and azo compounds, such as azobisisobutyronitrile. Water soluble initiators are preferred, such as potassium persulfate. Redox initiation involving an oxidant, such as potassium persulfate, and a reductant, such as sodium metabisulfite, can also be used to initiate polymerization, particularly at low temperatures.

Polymerizing at lower temperatures results in the formation of higher molecular weight polymers which are desirable from the standpoint of efficient aqueous viscosification. Typically, it is desired to employ from about 0.01 to about 0.5 weight percent of initiator, based on the weight of monomers. The polymerization temperature is preferably about 0° C. to about 90° C., more preferably about 20° C. to about 80° C., and most preferably about 25° C. to about 70° C.

The hydrophobically associating terpolymer compositions of this invention have been found useful for thickening aqueous fluids. To prepare these thickened fluids, an amount of the terpolymer thickening agent is dissolved in the aqueous fluid by agitation, using any of a number of techniques well known in the art. For example, a marine impellor operating at relatively low speed can be used to first disperse and then dissolve these hydrophobically associating terpolymers. It is desirable to use relatively low agitation conditions since these polymers have a tendency to cause and stabilize foams which can be difficult to break. The aqueous solutions may be distilled water or high concentrations of electrolyte in water, such as in hard water or brine. Monovalent inorganic salts, such as sodium chloride, and divalent salts, such as calcium or magnesium chloride or sulfate, can be present in the brine in substantial amounts. A preferred method for preparing the thickened brine solutions involves first preparing a concentrated solution of the polymer in relatively fresh water and then adding a concentrated brine solution to obtain the desired final thickened brine solution.

The amount of polymeric thickening agent needed to produce a desired level of viscosification will depend on the composition of the electrolytes in the aqueous fluid and the temperature. In general, more polymer will be required as the electrolyte concentration increases and as the temperature increases. Viscosification of about 2 to about 100 times or more that of the neat solvent can readily be achieved with the terpolymers prepared by the process of this invention. Preferably, about 0.01 to about 2.0 weight percent, more preferably about 0.05 to about 1.0 weight percent, and most preferably about 0.1 to about 0.5 weight percent polymer, based on the aqueous medium, will provide the desired level of thickening efficiency.

The thickening efficiency of a given polymer is influenced by the amount of anionically charged sulfonate groups, the level and type of hydrophobic groups and the weight average molecular weight. The addition of the anionic sulfonate groups improves polymer solubility and enhances thickening efficiency due to repulsion of charges along the backbone, which tends to open the polymer coil and increase hydrodynamic volume. The hydrophobic groups decrease polymer solubility and associate in solution to physically bridge polymer molecules, creating greater resistance for flow and, hence, increased viscosity. The more insoluble the hydrophobic group is in the solvent, the less that is needed to create the associations in solution. For example, less dodecylacrylamide is needed in a polymer to create the same viscosification as a larger amount of octylacrylamide in a similar polymer. In addition, it is possible to have too much association, in which case the polymer becomes insoluble in the solvent and cannot be used as a viscosifier. Fortunately, the solubility characteristics of the sulfonate and hydrophobic groups are opposite one another and, thus, the addition of more sulfonate monomer can be used to counterbalance the addition of hydrophobic groups. Increasing both sulfonate and hydrophobic groups can result in a synergistic enhancement of thickening efficiency.

Molecular weight of the polymer is also an important consideration. High molecular weight polymers incorporating both anionically charged sulfonate groups and hydrophobic groups can provide significantly improved viscosification of water based fluids. All other things being equal, the higher the molecular weight the less soluble the polymer. Thus, as molecular weight is increased, the amount of hydrophobic groups should be reduced and the amount of sulfonate groups increased. It is desirable that the resulting polymer in an aqueous solution not be susceptible to irreversible mechanical degradation under shear. This places an upper limit on the molecular weight of about 10,000,000. Control of molecular weight is achieved by the concentration of monomers, the type and level of initiator and the reaction temperature. As is well known in the art, the molecular weight is increased by increasing the monomers level and decreasing the initiator level and reaction temperature.

To evaluate and characterize the unique and useful properties of the hydrophobically associating polymers of this invention, dilute solution viscometric measurements were made. These measurements were particularly useful for evaluating the effect of composition and polymerization process conditions on the hydrodynamic size of the polymer in solution and the influence of associating groups. The hydrodynamic size is measured by the intrinsic viscosity which is proportional to the viscosity average polymer molecular weight. To determine the intrinsic viscosity, the reduced viscosity is first evaluated at several polymer concentrations in the dilute concentration regime. The reduced viscosity is defined as the incremental viscosity increase of the polymer solution relative to the pure solvent normalized with respect to the pure solvent viscosity and the polymer concentration. A plot of reduced viscosity versus polymer concentration should yield a straight line at low polymer concentrations. The intercept of this reduced viscosity plot at zero polymer concentration is defined as the intrinsic viscosity, while the slope is the Huggin's interaction coefficient times the square of the intrinsic viscosity. The Huggins' constant is a measure of polymersolvent interactions. For hydrophobically associating polymers, it is characteristically greater than the 0.3 to 0.7 value normally observed for non-associating polymers, such as polyacrylamides.

Measurement of the dilute solution viscosity can be made with conventional Couette or capillary viscometers. A set of Ubbelohde capillary viscometers were used in this study and shear rate effects were found to be negligible in the concentration range of interest. However, since the terpolymers contain anionically charged groups, a polyelectrolyte effect was observed in dilute solution. The addition of salts, such as sodium chloride or sodium sulphate, shielded the charge repulsion, causing the polyelectrolyte effect and resulted in the desired linear reduced viscosity-concentration profile. The dilute solution measurements were thus made on solutions containing 2.0 weight percent chloride.

The solution viscosity of associating polymers in the semi-dilute concentration regime is dramatically different than conventional water soluble polymers. Viscosities of these solutions were measured by means of a Contraves ® low shear viscometer, model LS 30, using a No. 1 cup and a No. 1 bob. Temperatures were controlled to ±0.1° C. and measurements were made at a variety of rotational speeds corresponding to shear rates from about 1.0 sec$^{-1}$ to about 100 sec$^{-1}$. In contrast to conventional water soluble polymers and relatively low molecular weight weakly associating polymers, the terpolymers of this invention can exhibit significant relaxation times which result in slow equilibration. To determine steady state viscosity values at a given stress or shear rate, relatively long measurement times were employed. This effect is most evident at higher polymer concentrations, higher polymer molecular weights and in regions of strong intermolecular hydrophobic associations.

DESCRIPTION OF THE PREFERRED EMBODIMENTS

The following Examples illustrate the present invention without, however, limiting the same hereto.

EXAMPLE 1

Micellar Polymerization with Sulfonate Containing Monomers

Radical Initiation

A one liter Morton style kettle, fitted with a chilled water condenser, thermometer, nitrogen sparger, and mechanical stirrer, was charged with 500 ml of purified water. The water was refluxed for 1 hour with a nitrogen purge and then cooled to room temperature. Acrylamide, 8.11 g (0.11 mole), 6.62 g (0.023 mole) of AMPS ®, 0.265 g of N-octylacrylamide and 15 g of sodium dodecyl sulfate (SDS) were charged into the flask. The reaction solution was heated to 50° C. and 0.0047 g potassium persulfate was added. After 22.75 hours at 50° C. and 300 rpm stirring, the viscous solution was slowly poured into 3L of methanol and the precipitated polymer was isolated by filtration. The polymer was then masticated in a Warning blender with 2L of methanol for 30 seconds, filtered and dried under vacuum at room temperature. The yield of polymer was 10.73 g. A variety of terpolymers were prepared using similar procedures but with different amounts of acrylamide, AMPS ®, N-octylacrylamide, SDS and initiator levels, as shown in Table I.

EXAMPLE 2

Micellar Polymerization with Sulfonate Containing Monomers

Redox Initiation

A solution of 15.0 g of SDS in 500 ml of purified, deoxygenated water was prepared and 0.298 g of N-octylacrylamide, 12.24 g of acrylamide and 9.96 g of AMPS ® were added. The resulting clear solution was placed into a two liter Morton style resin kettle fitted with a chilled water condenser, thermometer, nitrogen sparger and mechanical stirrer. The solution was purged with nitrogen for 0.5 hours at 25.0° C., then 0.0114 g of potassium persulfate and 0.0075 g of sodium metabisulfite were added. After 16 hours of stirring at 300 rpm and 25.0° C., the reaction mixture was slowly poured in 3L of methanol. The precipitated polymer was isolated and masticated with 1 L of methanol in a Waring blender for 30 seconds, filtered and dried under vacuum at 30° C. The yield of polymer was 15.4 g. A variety of terpolymers were prepared using similar low temperature redox initiation procedures but with different amounts of acrylamide, AMPS ®, N-octylacrylamide, SDS and initiator levels, as shown in Table II.

EXAMPLE 3

Terpolymerization of N-Octylacrylamide-Acrylamide-Vinyl Sulfonate

A one liter Morton style resin kettle, fitted with a chilled water condenser, thermometer, nitrogen sparger and mechanical stirrer was charged with 500 ml of purified water. The water was refluxed for 1 hour with a nitrogen purge and then cooled to room temperature. Acrylamide, 9.886 g (0.14 mole), 4.81 g (0.37 mole) of sodium vinyl sulfonate as a 25% solution in water, 0.33 g (0.002 mole) of N-octylacrylamide and 15 g of sodium dodecyl sulfate (SDS) were charged into the flask. The reaction solution was heated to 50° C. and 0.01 g potassium persulfate was added. After 17 hours at 50° C. and 300 rpm stirring the viscous solution was slowly poured into 3 L of methanol and the precipitated polymer was isolated by filtration. The polymer was then masticated in a Waring blender with 2 L of methanol for 30 seconds, filtered and dried under vacuum at room temperature. The yield of the polymer was 10.9 g.

EXAMPLE 4

Micellar Polymerization of N-Octylacrylamide-Acrylamide-Sodium Styrene Sulfonate A solution of 15.0 g of SDS in 500 ml of purified, deoxygenated water was prepared and 0.415 g of N-octylacrylamide, 12.73 g of acrylamide and 9.35 g of sodium styrene sulfonate were added. The resulting clear solution was placed in a 2 liter Morton style resin kettle fitted with a chilled water condenser, thermometer, nitrogen sparger and mechanical stirrer. The solution was purged with nitrogen for 0.5 hour at 25° C., then 0.116 g of potassium persulfate and 0.0082 g of sodium metabisulfite were added. After 16 hours of stirring at 300 rpm and 25° C. the reaction mixture was slowly poured into 3 L of acetone. The precipitated polymer was isolated and masticated with 1 L of methanol in a Waring blender for 30 seconds, filtered and dried under vacuum at 30° C. The yield of polymer was 5.14 g.

EXAMPLE 5

Solution Viscometrics

Polymer solutions were prepared by the slow addition of a weighted polymer sample to rapidly stirred 2% NaCl solution. Upon complete addition, the stirring was stopped and the flask was sealed under nitrogen. Dissolution was allowed to progress with mild agitation for 24 hours or longer, until solutions were homogeneous and clear. For characterization in brines containing divalent cations a mixture of 3.0% NaCl and 0.3% $CaCl_2$ was used and designated as 3.3% brine. To prepare these solutions polymers were initially hydrated in water, followed by addition of concentrated brine solution to give the final polymer concentration of 1,500 ppm in 3.3% brine.

Viscosities of these solutions were measured by means of a Contraves® low shear viscometer, model LS30, using a No. 1 cup and No. 1 bob. Temperatures were controlled to ±0.1° C. and measurements were made at a variety of rotational speeds corresponding to shear rates from about 1.0 $sec^{-1}$ to about 100 $sec^{-1}$. In contrast to conventional water soluble polymers and relatively low molecular weight, weakly associating polymers, the terpolymers of this invention can exhibit significant relaxation times, which result in slow equilibration. To determine steady state viscosity values at a given stress or shear rate, relatively long measurement times were employed. This effect is most evident at higher polymer concentrations, higher polymer molecular weights and in regions of strong intermolecular hydrophobic associations. Intrinsic viscosity was determined using Ubbelohde capillary viscometers. The solvent for these measurements was 2% NaCl solutions.

The influence of hydrophobic associations and sulfonate monomer content on solution rheological properties is illustrated in Table III. The solution viscosities were measured at shear rates of 1.3 and 11 $sec^{-1}$ on solutions containing 1,500 ppm polymer in 3.3% brine. The presence of only 0.75 mole percent octylacrylamide has increased the low shear viscosity by more than an order of magnitude, as observed by comparing sample number 7364 and 7367 in Table III. A further increase in viscosity is noted by simultaneously raising both the AMPS® level and hydrophobe content. These significant enhancements in solution viscosity are due to changes in solubility and hydrophobic associations and have little to do with polymer molecular weight. This is indicated by the approximately constant value of the intrinsic viscosity, which is a measure of molecular weight. The presence of associations is evidenced by the jump in the Huggins' coefficient from 0.4, for the nonassociating polymers, to about 1.5, for the associating polymers.

The synthesis conditions can have a dramatic effect on polymer molecular weight. Increasing reactor monomer concentration brought about significant increases in solution viscosity, as shown in Table IV, for a series of terpolymers containing 30 mole percent AMPS and 0.75 mole percent $C_8AM$. A linear response of solution viscosity was observed as the monomer concentration was increased from 4.5 to 9 weight percent. Doubling the monomer concentration from 4.5 to 9 weight percent resulted in a five-fold increase in viscosity at 11 $sec^{-1}$.

EXAMPLE 6

EFFECT OF AMPS® CONTENT ON MICELLAR POLYMERIZATION

The effect of the amount of AMPS® in the terpolymer on the solution viscosity in brine was to decrease the viscosity with increased AMPS®, as shown in Table V. The experiments were done at a constant concentration (4.5 weight percent) of total monomers and $C_8AM$ charge (0.75 mole percent). The loss of viscosification efficiency with increasing AMPS® content could be explained on the basis of decreased molecular weight and associations. Although either cause is plausible, the effect still needs to be overcome. As described in Examples 5 and 7, this loss of viscosification can be compensated for by adjustment of reactor monomer concentration and hydrophobe level, respectively.

EXAMPLE 7

EFFECT OF HYDROPHOBIC MONOMER CONCENTRATION

The influence of hydrophobe level on polymer solution viscosity can be seen from the data in Table VI for two series of polymers containing 30 and 40 mole percent AMPS®, respectively. The total monomer concentration was held at 4.5 weight percent and the hydrophobe, N-1-octylacrylamide, concentration was varied from 0 to 1.5 mole percent. The maximum response in viscosity occurred at 1.0% for 30 mole percent AMPS® and 1.25% for the 40 mole percent AMPS® series. The viscometric data further indicates that the increase in viscosification occurs at a relatively narrow level of hydrophobic groups which depends on the level of sulfonate monomer in the polymer. This is unexpected based on the prior art.

EXAMPLE 8

EFFECT OF SURFACTANT LEVEL

The concentration of surfactant used during micellar polymerization can have a significant effect on the resultant hydrophobe-containing polymer. The solution viscosity data in Table VII are for a series of 40 mole percent AMPS® terpolymers at two levels of hydrophobe, 0.75 and 1.0 mole percent. At 0.75 mole percent $C_8AM$ maximum viscosity was achieved at a sodium dodecyl sulfate (SDS) concentration of 2 weight percent. Increasing the hydrophobe level required 3 weight percent SDS to achieve maximum viscosity.

The solution clarity of hydrophobically associating polymers can be used as a measure of polymer stability. Thus, low concentrations of surfactant used during micellar polymerization result in polymers with poor solubility in brine. The brine solutions of these polymers are turbid and less viscous. As the surfactant concentration is increased during polymerization, the brine solutions of the resultant polymers become clearer. It can also be seen that there is an optimum concentration of surfactant at which the maximum solution viscosity is attained. The optimum surfactant concentration is a function of the hydrophobe content of the polymer; the optimum surfactant concentration increases as the hydrophobe concentration increases. In addition, the optimum type and content of surfactant used in the micellar polymerization is a function of the type and amount of sulfonate monomer.

TABLE I

POLY(N-OCTYLACRYLAMIDE-ACRYLAMIDE-AMPS ® TERPOLYMERS

| Example V- | Hydrophobe Mole % | AMPS ® Mole % | SDS Conc. Wt. % | Initiator Level $[M]/[I]\,0.5$ | g | % |
|---|---|---|---|---|---|---|
| 7181 | 0.0 | 20 | 2.0 | 49 | 13.8 | 92 |
| 7182 | 0.0 | 20 | 3.0 | 49 | 14.4 | 96 |
| 7185 | 1.0 | 20 | 2.0 | 49 | 10.7 | 71 |
| 7198 | 0.75 | 20 | 2.0 | 49 | 14.0 | 93 |
| 7199 | 1.0 | 30 | 2.0 | 49 | 14.0 | 93 |
| 7202 | 0.50 | 20 | 2.0 | 49 | 11.0 | 73 |
| 7203 | 1.0 | 10 | 2.0 | 49 | 13.1 | 87 |
| 7208 | 1.0 | 20 | 3.0 | 49 | 11.6 | 77 |
| 7220 | 1.0 | 20 | 3.0 | 49 | 12.9 | 86 |
| 7272 | 1.0 | 20 | 3.0 | 49 | 7.3 | 49 |
| 7273 | 1.0 | 10 | 3.0 | 49 | 10.9 | 73 |
| 7274 | 1.0 | 30 | 3.0 | 49 | 5.0 | 33 |
| 7275 | 0.75 | 20 | 3.0 | 49 | 7.2 | 48 |
| 7276 | 1.25 | 20 | 3.0 | 49 | 7.2 | 48 |
| 7277 | 1.0 | 20 | 3.0 | 100 | 5.7 | 38 |
| 7278 | 1.0 | 20 | 3.0 | 49 | 12.2 | 81 |
| 7279 | 1.0 | 10 | 3.0 | 49 | 13.1 | 87 |
| 7280 | 1.0 | 30 | 3.0 | 49 | 11.3 | 75 |

TABLE II

POLY(N-OCTYLACRYLAMIDE-ACRYLAMIDE-AMPS ® TERPOLYMERS

| Exp. No. | Hydrophobe Mole % | AMPS ® Mole % | Redox Initiators, $M \times 10^5$ $K_2S_2O_8$ | $Na_2S_2O_5$ | Yield g | % |
|---|---|---|---|---|---|---|
| 412SX | 1.25 | 40 | 4.6 | 4.6 | 16.7 | 67 |
| 7364 | 0.75 | 20 | 7.9 | 7.49 | 15.5 | 64 |
| 7367 | 0.0 | 20 | 7.4 | 7.6 | 16.4 | 68 |
| 7380 | 0.75 | 40 | 8.6 | 2.3 | 20.6 | 82 |
| 7381 | 0.75 | 40 | 4.3 | 4.6 | 20.5 | 82 |
| 7391 | 0.75 | 30 | 5.5 | 5.9 | 14.8 | 61 |
| 7393 | 0.75 | 30 | 5.5 | 5.9 | 21.4 | 68 |
| 7394 | 0.75 | 20 | 3.7 | 4.0 | 31.9 | 64 |
| 7395 | 0.75 | 30 | 5.5 | 5.9 | 12.3 | 51 |
| 7404 | 1.25 | 30 | 5.5 | 5.9 | 14.9 | 63 |
| 7405 | 1.0 | 40 | 4.3 | 4.6 | 14.0 | 58 |
| 7406 | 1.25 | 40 | 4.3 | 4.6 | 15.1 | 62 |
| 7407 | 1.5 | 30 | 5.4 | 5.9 | 16.7 | 68 |
| 7416 | 0.0 | 30 | 2.8 | 3.0 | 31.8 | 65 |
| 7417 | 0.0 | 40 | 2.2 | 2.3 | 38.8 | 74 |
| 7455 | 0.75 | 30 | 5.5 | 5.9 | 46.4 | 94 |
| 7458 | 1.0 | 40 | 4.3 | 4.6 | 46.2 | 93 |
| 7508 | 1.0 | 40 | 4.3 | 4.6 | 46.1 | 94 |
| 7512 | 1.0 | 40 | 4.3 | 4.6 | 44.4 | 91 |
| 7513 | 0.75 | 40 | 4.3 | 4.6 | 43.2 | 88 |
| 7522 | 0.75 | 40 | 4.3 | 4.6 | 44.4 | 90 |
| 7523 | 0.75 | 40 | 4.3 | 4.6 | 42.1 | 87 |
| 7529 | 0.75 | 40 | 2.1 | 2.3 | 47.0 | 92 |

TABLE III

SOLUTION PROPERTIES OF REDOX POLYMERIZED AMPS ® TERPOLYMERS

| Example No. | Hydrophobe Mole % | AMPS ® Mole % | Viscosity, cP, at 1.3 sec$^{-1}$ | 1 sec$^{-1}$ | Intrinsic Viscosity dl/g | Huggins Coefficient |
|---|---|---|---|---|---|---|
| 7364 | 0.75 | 20 | 73 | 26 | 10.0 | 1.5 |
| 7395 | 1.0 | 30 | 52 | 25 | 10.4 | 1.3 |
| 7406 | 1.25 | 40 | 289 | 45 | 9.2 | 1.4 |
| 7367 | 0.0 | 20 | 4.8 | 4.8 | 13 | 0.4 |

TABLE IV

EFFECT OF MONOMER CONCENTRATION ON TERPOLYMER SOLUTION VISCOMETRICS

Polymer Composition: N—$C_8AM$ = 0.75 mole %, AMPS ® = 30.0 mole %

| Example No. | Monomer Concentration | Viscosity, cP at 1,500 ppm in 3.3% Brine 1.3 sec$^{-1}$ | 11 sec$^{-1}$ |
|---|---|---|---|
| 7391 | 0.38 | 7.8 | 6.7 |
| 7393 | 0.50 | 17 | 13 |
| 7455 | 0.75 | 84 | 25 |

TABLE V

EFFECT OF AMPS ® ON TERPOLYMER SOLUTION VISCOSITY

| Example No. | AMPS ® Mole % | Viscosity, cP at 1,500 ppm in 3.3% Brine 1.3 sec$^{-1}$ | 11 sec$^{-1}$ |
|---|---|---|---|
| 7364 | 20 | 73 | 25 |
| 7391 | 30 | 8 | 7 |
| 7381 | 40 | 6 | 5 |

TABLE VI

EFFECT OF HYDROPHOBIC MONOMER CONCENTRATION

| Exp. No. | N—C8AM Mole % | AMPS ® Mole % | Viscosity, cP at 1,500 pm in 3.3% Brine 1.3 sec$^{-1}$ | 11 sec$^{-1}$ |
|---|---|---|---|---|
| 7416 | 0 | 30 | 5 | 5 |
| 7391 | 0.75 | 30 | 8 | 7 |
| 7395 | 1.0 | 30 | 378 | 54 |
| 7404 | 1.25 | 30 | 79 | 25 |
| 7407 | 1.5 | 30 | 13 | 8 |
| 7417 | 0 | 40 | 4 | 4 |
| 7380 | 0.75 | 40 | 6 | 5 |
| 7405 | 1 | 40 | 7 | 6 |
| 412SX | 1.25 | 40 | 279 | 44 |

TABLE VII

EFFECT OF SURFACTANT CONCENTRATION ON TERPOLYMER SOLUTION VISCOSITY
Hydrophobic Monomer = $C_8AM$, AMPS ® = 40 Mole %

| Example No. | $C_8AM$ Mole % | SDS Wt. % | Viscosity, cP, at 1,500 ppm in 3.3% Brine | |
|---|---|---|---|---|
| | | | 1.3 sec$^{-1}$ | 11 sec$^{-1}$ |
| 5722 | 0.75 | 1.5 | 74 | 22 |
| 7513 | 0.75 | 2 | 70 | 23 |
| 7523 | 0.75 | 2.5 | 10 | 9 |
| 7529 | 0.75 | 3 | 8 | 6 |
| 7458 | 1 | 3 | 114 | 24 |
| 7512 | 1 | 4.5 | 8 | 6 |
| 7508 | 1 | 6 | 5 | 5 |

EXAMPLE 9

TERPOLYMERIZATION OF N-ALKYLACRYLAMIDE, ACRYLAMIDE AND AMPS ®

A solution of 15.0 g of SDS in 500 ml of purified, deoxygenated water was prepared and N-alkylacrylamide, acrylamide and 2-acrylamido 2-methylpropane sulfonate were added. The resulting clear solution was placed into a 2 liter Morton style resin kettle fitted with a chilled water condenser, thermometer, nitrogen sparger and mechanical stirrer. The solution was purged with nitrogen for 0.5 hours at 25° C., then potassium persulfate and sodium metabisulfite were added. After 16 hours of stirring at 300 rpm and 25° C., the reaction mixture was slowly poured into 3 L of methanol. The precipitated polymer was isolated and masticated with 1 L of methanol in a Waring blender for 30 seconds, filtered and dried under vacuum at 30° C. A variety of terpolymers were prepared using similar low temperature redox initiation procedures, but with different types and amounts of N-alkylacrylamide hydrophobes and amounts of acrylamide, AMPS ®, SDS and initiator levels, as shown in Table VIII.

TABLE VIII

ADDITIONAL HYDROPHOBIC POLYMERS

| Exp. No. | HYDROPHOBE TYPE | MOLE % | AMPS ® MOLE % | Redox Initiators, M × 10$^5$ | | Yield | |
|---|---|---|---|---|---|---|---|
| | | | | $K_2S_2O_8$ | $Na_2S_2O_5$ | g | % |
| 7515 | $C_6AM$ | 0.75 | 20 | 7.9 | 7.9 | 16.4 | 73 |
| 7521 | $C_6AM$ | 1 | 20 | 7.9 | 7.9 | 14.2 | 63 |
| 7527 | $C_6AM$ | 1.5 | 20 | 7.8 | 7.8 | 16.5 | 73 |
| 7533 | $C_6AM$ | 2 | 20 | 7.7 | 7.8 | 17.0 | 76 |
| 7494 | $t-C_8AM$ | 0.75 | 20 | 7.9 | 7.9 | 16.9 | 75 |
| 7552 | $t-C_8AM$ | 3 | 40 | 4.1 | 4.4 | 36.7 | 82 |
| 7553 | $t-C_8AM$ | 4 | 40 | 4.1 | 4.4 | 37.2 | 83 |
| 7545 | $t-C_8AM$ | 5 | 40 | 4.0 | 4.3 | 32.6 | 72 |
| 7517 | $C_{10}AM$ | 0.75 | 20 | 7.9 | 7.9 | 18.0 | 80 |
| 7546 | $C_{10}AM$ | 0.75 | 40 | 4.2 | 4.5 | 42.1 | 94 |
| 7503 | $C_{12}AM$ | 0.25 | 20 | 7.4 | 7.9 | 18.1 | 80 |
| 7502 | $C_{12}AM$ | 0.5 | 20 | 7.3 | 7.8 | 20.5 | 91 |
| 7547 | $C_{12}AM$ | 0.5 | 40 | 4.2 | 4.5 | 43.6 | 97 |
| 7550 | $C_{12}AM$ | 0.5 | 40 | 4.2 | 0.0 | 44.3 | 98 |
| 7495 | $C_{12}AM$ | 0.75 | 20 | 7.8 | 7.8 | 17.4 | 77 |

What is claimed is:

1. A solution comprising about 0.5 to about 3.0 grams of a terpolymer dissolved in 100 grams of water, wherein said terpolymer has the formula:

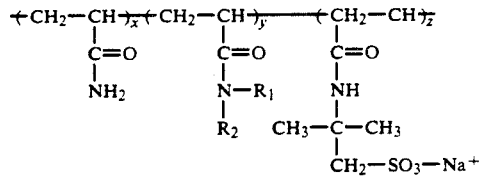

wherein $R_1$ is an alkyl group having about 4 to 18 carbon atoms; $R_2$ is hydrogen or an alkyl group having about 4 to 18 carbon atoms; x is about 10 to about 90; y is about 0.1 to 10 mole percent; and z is about 5 to 80 mole percent.

2. A solution according to claim 1 wherein said water has about 0.5 to about 20 grams of a salt per 100 grams of water dissolved therein.